US012597659B2

(12) United States Patent
Yun

(10) Patent No.: US 12,597,659 B2
(45) Date of Patent: Apr. 7, 2026

(54) BATTERY UNIT AND FEEDTHROUGH ASSEMBLY

(71) Applicant: Ningde Amperex Technology Limited, Ningde (CN)

(72) Inventor: Jiaye Yun, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 444 days.

(21) Appl. No.: 18/192,215

(22) Filed: Mar. 29, 2023

(65) Prior Publication Data

US 2023/0238623 A1 Jul. 27, 2023

Related U.S. Application Data

(63) Continuation of application No. PCT/CN2020/119704, filed on Sep. 30, 2020.

(51) Int. Cl.
*H01M 50/172* (2021.01)
*H01M 50/184* (2021.01)
*H01M 50/186* (2021.01)
*H01M 50/533* (2021.01)

(52) U.S. Cl.
CPC ....... *H01M 50/172* (2021.01); *H01M 50/184* (2021.01); *H01M 50/186* (2021.01); *H01M 50/533* (2021.01)

(58) Field of Classification Search
CPC ............. H01M 50/172; H01M 50/186; H01M 50/533; H01M 50/184
See application file for complete search history.

(56) References Cited

U.S. PATENT DOCUMENTS

2015/0255762 A1 9/2015 Feigl

FOREIGN PATENT DOCUMENTS

| CN | 101399323 A | 4/2009 |
| CN | 104641488 A | 5/2015 |
| CN | 108232052 A | 6/2018 |
| CN | 108352467 A | 7/2018 |

(Continued)

OTHER PUBLICATIONS

International Search Report issued on Apr. 28, 2021, in corresponding International Patent Application No. PCT/CN2020/119704, 6 pages.

(Continued)

*Primary Examiner* — Sarah A. Slifka
(74) *Attorney, Agent, or Firm* — Maier & Maier, PLLC

(57) ABSTRACT

A battery unit includes a housing assembly; an electrode assembly; a conductive plate; and a feedthrough assembly including a first washer and a rivet. The first washer includes a first gasket portion accommodated in the housing assembly, a second gasket portion disposed on an outer surface of the housing assembly, and a connecting portion connecting the first gasket portion and the second gasket portion. The housing is provided with a through hole for the connecting portion to run through. The rivet runs through and abuts against the first gasket portion, the connecting portion, and the second gasket portion to seal the through hole. The first washer and the rivet are mounted to the housing assembly via a clamping force applied to the first gasket portion and the second gasket portion after the rivet is riveted and deforms and a counterforce of the housing assembly.

17 Claims, 5 Drawing Sheets

(56)    References Cited

FOREIGN PATENT DOCUMENTS

| | | | |
|---|---|---|---|
| CN | 207868267 | U | 9/2018 |
| CN | 110459727 | A | 11/2019 |
| CN | 209947930 | U | 1/2020 |
| CN | 111081916 | A | 4/2020 |
| CN | 111244332 | A | 6/2020 |
| JP | H09129197 | | 5/1997 |
| JP | 2000231917 | A | 8/2000 |
| JP | 2002151022 | A | 5/2002 |
| JP | 2002164025 | A | 6/2002 |
| JP | 2014170664 | A | 9/2014 |

OTHER PUBLICATIONS

Office Action issued on Apr. 28, 2023, in corresponding Chinese Application No. 202080082185.9, 18 pages.
Office Action issued on Apr. 2, 2024, in corresponding Japanese Application No. 2023-508053, 7 pages.
Office Action issued on Sep. 17, 2024, in corresponding Japanese Application No. 2023-508053, 7 pages.
Notice of Allowance issued on Feb. 25, 2025, in corresponding Japanese Application No. 2023-508053, 4 pages.

BATTERY UNIT AND FEEDTHROUGH ASSEMBLY

CROSS REFERENCE TO RELATED APPLICATIONS

This application is a continuation application of PCT application: PCT/CN2020/119704 filed on Sep. 30, 2020, the disclosure of which is hereby incorporated by reference in its entirety.

TECHNICAL FIELD

This application relates to the field of battery technologies, and in particular, to a battery unit and a feedthrough assembly.

BACKGROUND

A battery unit is an apparatus that converts external energy into electric energy and stores the electric energy therein to supply power to an external device (for example, a portable electronic device) as needed. Generally, a battery unit includes a housing assembly and an electrode assembly disposed inside the housing assembly. The electrode assembly typically includes a positive electrode plate and a negative electrode plate that are circularly and alternately arranged, and a separator sandwiched therebetween for separating the positive electrode plate from the negative electrode plate. Typically, the housing assembly is a conductor. One of the positive electrode plate and the negative electrode plate is electrically connected to the housing assembly via a conductive element, and the other needs to be electrically connected, indirectly via a conductive plate, to a feedthrough assembly running through the housing assembly and is insulated from the housing assembly to avoid a short circuit of the battery unit.

In the prior art, the feedthrough assembly is fastened to the housing assembly by welding. However, a thermal effect of the welding process may greatly change local stress of a part of the housing assembly corresponding to the feedthrough assembly, thereby reducing sealing performance of the battery unit.

SUMMARY

This application is intended to provide a battery unit and a feedthrough assembly, so as to resolve the existing technical issue that in an existing battery unit, the feedthrough assembly being welded to the housing assembly makes local stress of a part of a housing assembly corresponding to a feedthrough assembly greatly change due to a thermal effect.

The following technical solutions are adopted for this application to resolve the technical issue:

A battery unit includes a housing assembly, an electrode assembly, a conductive plate electrically connected to the electrode assembly, and a feedthrough assembly. The electrode assembly and the conductive plate are both accommodated in the housing assembly. The feedthrough assembly includes a first washer, a second washer, and a rivet.

The first washer includes a first gasket portion, a second gasket portion, and a connecting portion, where the first gasket portion is accommodated in the housing assembly, the second gasket portion is disposed on an outer surface of the housing assembly, the connecting portion connects the first gasket portion and the second gasket portion, and the housing assembly is provided with a through hole for the connecting portion to run through.

The rivet includes a shaft portion, an end portion, and a limiting portion, where the shaft portion sequentially runs through the first gasket portion, the connecting portion, and the second gasket portion, the end portion is disposed at an end of the shaft portion that is accommodated in the housing assembly, the limiting portion is disposed at an end of the shaft portion that extends out of the housing assembly, and the end portion and the limiting portion are configured to press the first gasket portion and the second gasket portion to seal the through hole. The above conductive plate is electrically connected to the rivet.

In a further improvement solution of the foregoing technical solution, the first gasket portion, the second gasket portion, and the connecting portion are integrally formed, where the first gasket portion and the second gasket portion are plate structures.

In a further improvement solution of the foregoing technical solution, the second gasket portion is extruded by the limiting portion to extend in parallel with respect to the connecting portion and flange outward to be opposite to the first gasket portion.

In a further improvement solution of the foregoing technical solution, the limiting portion is formed by compressional deformation of the rivet during a riveting process, and the end portion is a plate structure.

In a further improvement solution of the foregoing technical solution, the battery unit further includes an insulator, where the insulator is disposed between the second gasket portion and the limiting portion.

In a further improvement solution of the foregoing technical solution, the insulator is an annular washer, where the annular washer fits around the shaft portion.

In a further improvement solution of the foregoing technical solution, the battery unit further includes the second washer, where the second washer is embedded between the end portion and the first gasket portion.

In a further improvement solution of the foregoing technical solution, the second washer is provided with an accommodating groove for accommodating an end portion of the rivet. A side wall of the end portion of the rivet and a groove wall of the accommodating groove are at least partially attached to each other, so as to prevent the end portion of the rivet from rotating relative to the second washer.

In a further improvement solution of the foregoing technical solution, the side wall of the end portion of the rivet includes two first side wall units disposed opposite to each other, and the groove wall of the accommodating groove includes two second side wall units disposed opposite to each other, where one of the first side wall units is correspondingly attached to one of the second side wall units.

In a further improvement solution of the foregoing technical solution, the side wall of the second washer is at least partially attached to an inner surface of the housing assembly, so as to prevent the second washer from rotating around the rivet relative to the housing assembly.

In a further improvement solution of the foregoing technical solution, the second washer is fastened to the housing assembly.

In a further improvement solution of the foregoing technical solution, the battery unit further includes an insulating partition, where the insulating partition is disposed between the end portion and the electrode assembly. The insulating partition is provided with a through groove, where the conductive plate runs through the through groove and is electrically connected to the rivet.

The following technical solutions are further adopted for this application to resolve the technical issue:

A feedthrough assembly includes a first washer and a rivet. The first washer includes a first gasket portion and a connecting portion, where the first gasket portion is formed by extending outward from an end of the connecting portion. The rivet includes a shaft portion and an end portion, where the shaft portion sequentially runs through the first gasket portion and the connecting portion, the end portion is disposed at a first end of the shaft portion, and a second end of the shaft portion is configured for forming a limiting portion by compression during a riveting process, so as to make the end portion and the limiting portion are configured to press the first gasket portion and the end of the connecting portion farther away from the first gasket portion, thereby making the end of the connecting portion farther away from the first gasket portion flange outward to form a second gasket portion disposed opposite to the first gasket portion.

In a further improvement solution of the foregoing technical solution, the feedthrough assembly further includes an insulator, where the insulator fits around the shaft portion.

In a further improvement solution of the foregoing technical solution, the end portion of the rivet is fastened to an end of the shaft portion closer to the first gasket portion.

In a further improvement solution of the foregoing technical solution, the feedthrough assembly further includes the second washer, where the second washer is embedded between the end portion and the first gasket portion.

In a further improvement solution of the foregoing technical solution, the second washer is provided with an accommodating groove for accommodating the end portion. A side wall of the end portion of the rivet and a groove wall of the accommodating groove are at least partially attached to each other, so as to prevent the end portion of the rivet from rotating relative to the second washer.

In a further improvement solution of the foregoing technical solution, the side wall of the end portion of the rivet includes two first side wall units disposed opposite to each other, and the groove wall of the accommodating groove includes two second side wall units disposed opposite to each other, where one of the first side wall units is correspondingly attached to one of the second side wall units.

This application has the following beneficial effects:

The battery unit according to some embodiments of this application includes a housing assembly, an electrode assembly, a conductive plate, and a feedthrough assembly. The feedthrough assembly includes a first washer and a rivet. The first washer includes a first gasket portion, a second gasket portion, and a connecting portion. The first gasket portion is accommodated in the housing assembly, the second gasket portion is disposed on an outer surface of the housing assembly, and the connecting portion connects the first gasket portion and the second gasket portion. Correspondingly, the housing assembly is provided with a through hole for the connecting portion to run through. The rivet sequentially runs through the first gasket portion, the connecting portion, and the second gasket portion, and the end portion of the rivet and the limiting portion are configured to press the first gasket portion and the second gasket portion to seal at the through hole. A positive electrode plate or a negative electrode plate in the electrode assembly is electrically connected to the rivet via the conductive plate, so as to make the rivet be an external terminal of the battery unit.

In the battery unit according to some embodiments of this application, the feedthrough assembly is not fastened to the housing assembly through thermal processing processes such as welding, but the first washer and the rivet are mounted to the housing assembly via a clamping force applied to the first gasket portion and the second gasket portion produced after the rivet is riveted and deforms and an interaction force produced by the housing assembly. This can effectively avoid a defect that local stress of a part of the housing assembly corresponding to the feedthrough assembly conspicuously changes due to a thermal effect. That is, sealing performance of the battery unit can be improved to some extent.

BRIEF DESCRIPTION OF DRAWINGS

To describe the technical solutions in some embodiments of this application more clearly, the following briefly describes the accompanying drawings required for describing the examples of this application. Apparently, the accompanying drawings in the following descriptions show merely some examples of this application, and persons of ordinary skill in the art may still derive other drawings from the structures shown in the accompanying drawings without creative efforts.

DETAILED DESCRIPTION

For ease of understanding this application, the following further describes this application in detail with reference to the accompanying drawings and specific embodiments. It should be noted that when a component is referred to as being "fixed to", or "fastened to" another component, it may be directly fastened to the another component, or there may be one or more components therebetween. When a component is deemed as being "connected to" another component, it may be directly connected to the another component, or there may be one or more components in between. The terms "vertical", "horizontal", "left", "right", "inside", "outside", and similar expressions used in this specification are merely for description purposes.

Unless otherwise defined, all technical and scientific terms used herein shall have the same meanings as commonly understood by those skilled in the art to which this application belongs. The terms used in the specification of this application are merely intended to describe specific embodiments but not to constitute any limitations on this application. The term "and/or" used herein includes any and all combinations of one or more associated items that are listed.

In addition, technical features involved in different embodiments of this application that are described below may be combined as long as they do not conflict with each other.

In this specification, "mount" includes fixing or limiting an element or apparatus to a specific location or place by means of welding, screwing, clamping, bonding, or the like. The element or apparatus may stay still at the specific position or place, or may move within a limited range. After being fastened or limited to the specific position or place, the element or apparatus can be disassembled or cannot be disassembled. This is not limited in some embodiments of this application.

Figure 1:
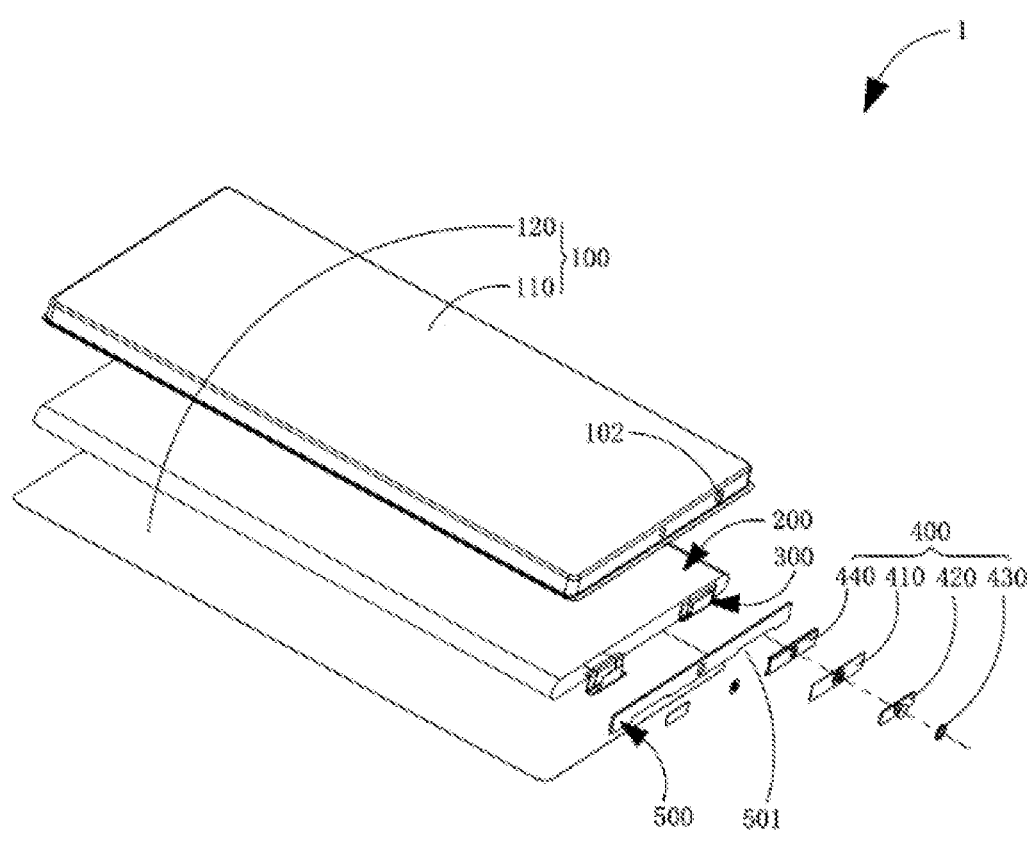
FIG. 1 is a schematic exploded view of a battery unit according to an embodiment of this application.
Figure 2:
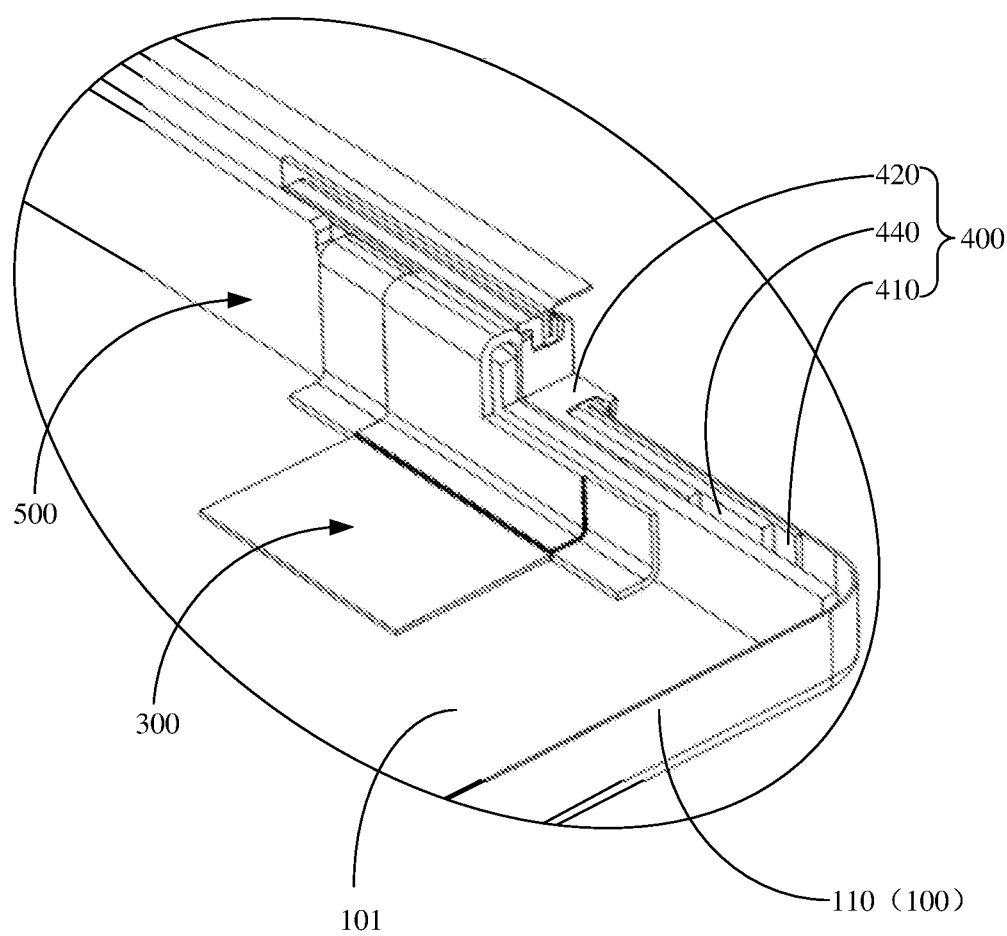
FIG. 2 is a local view of a rotary cross-sectional view of the battery unit in FIG. 1.
Figure 4:
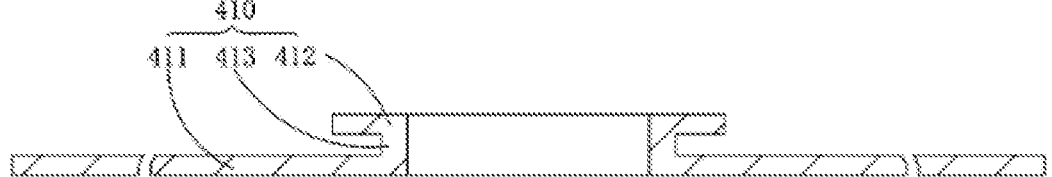
FIG. 4 is a schematic cross-sectional diagram of the first washer in FIG. 1 in a direction.
Figure 5:
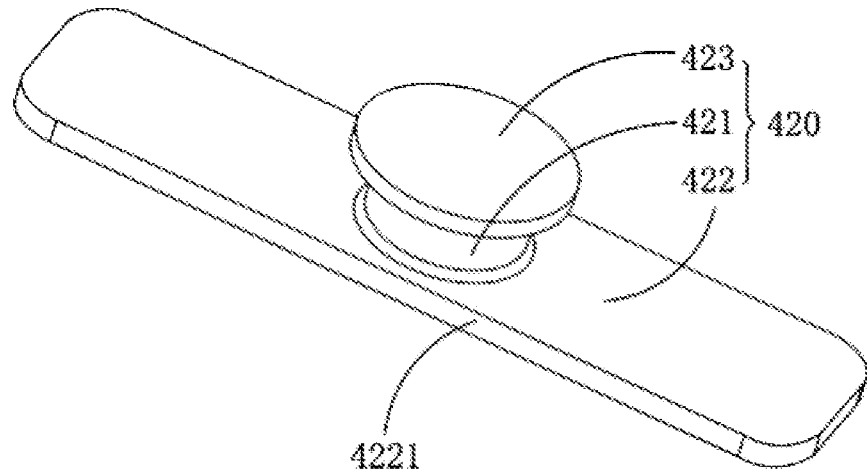
FIG. 5 is a stereoscopic schematic diagram of the rivet in FIG. 1.

Referring to FIG. 1 and FIG. 2, FIG. 1 and FIG. 2 are respectively a schematic exploded view of a battery unit 1 according to an embodiment of this application and a local view of a rotary cross-sectional view of the battery unit 1. The battery unit 1 includes a housing assembly 100, an electrode assembly 200, a conductive plate 300, and a feedthrough assembly 400. An accommodating cavity 101 is provided inside the housing assembly 100, where the electrode assembly 200 and the conductive plate 300 are both accommodated in the accommodating cavity 101 of the housing assembly 100. The feedthrough assembly 400 includes a first washer 410 and a rivet 420. With reference to FIG. 4, the first washer 410 includes a first gasket portion 411, a second gasket portion 412, and a connecting portion 413. The first gasket portion 411 is accommodated in the accommodating cavity 101 of the housing assembly 100, the second gasket portion 412 is disposed on an outer surface of the housing assembly 100, and the connecting portion 413 is connected to the first gasket portion 411 and the second gasket portion 412. Correspondingly, the housing assembly 100 is provided with a through hole 102 for the connecting portion 413 to run through. With reference to FIG. 5, the rivet 420 includes a shaft portion 421, an end portion 422, and a limiting portion 423, where the shaft portion 421 sequentially runs through the first gasket portion 411, the connecting portion 413, and the second gasket portion 412, the end portion 422 is disposed at an end of the shaft portion 421 that is accommodated in the housing assembly 100, the limiting portion 423 is disposed at an end of the shaft portion 421 that extends out of the housing assembly 100, and the end portion 422 and the limiting portion 423 together are configured to press the first gasket portion 411 and the second gasket portion 412 to seal the through hole 102. The foregoing conductive plate 300 is respectively electrically connected to the electrode assembly 200 and the rivet 420.

For the housing assembly 100, specifically referring to FIG. 1, the housing assembly 100 is of a flat rectangular shape and includes a housing 110 and a cover 120. The housing 110 is of a box-shaped structure having an open end as a whole, and the cover 120 covers and is fastened to the open end of the housing 110, the housing 110 and the cover 120 together enclose the accommodating cavity 101.

For the electrode assembly 200, still referring to FIG. 1, the electrode assembly 200 is accommodated in the accommodating cavity 101 of the housing assembly 100 and includes a positive electrode plate and a negative electrode plate that are alternately arranged, and a separator sandwiched therebetween for separating the positive electrode plate from the negative electrode plate. The electrode assembly 200 is folded into a approximately rectangular shape for ease of being accommodated in the accommodating cavity 101. The electrode assembly 200 is a core component for charging or discharging the battery unit 1. One of the positive electrode plate and the negative electrode plate is electrically connected to the housing assembly 100 via a conductive element not shown, and the other is electrically connected to the feedthrough assembly 400 via the conductive plate 300, so as to make the feedthrough assembly 400 be an external terminal of the battery unit 1. The housing assembly 100 is further filled with an electrolyte, where the electrode assembly 200 is infiltrated in the electrolyte. The electrolyte is used for providing an environment for lithium ion conduction, so that the lithium ion can intercalate into the positive electrode plate or the negative electrode plate at right time, implementing a charge and discharge process of the battery unit 1.

For the feedthrough assembly 400, still referring to FIG. 1, the feedthrough assembly 400 includes the first washer 410 and the rivet 420. For ease of understanding, the following may sequentially describe the first washer 410 and the rivet 420 in detail.

Figure 3:
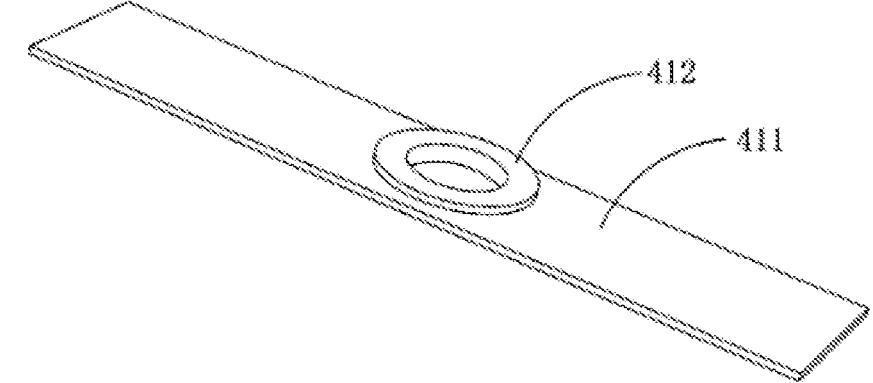
FIG. 3 is a stereoscopic schematic diagram of the first washer in FIG. 1.

For the foregoing first washer 410, referring to FIG. 3 and FIG. 4, FIG. 3 and FIG. 4 are respectively a stereoscopic schematic diagram of the first washer 410 and a schematic cross-sectional diagram of the first washer 410 in a direction. With reference to other accompanying drawings, the first washer 410 is an insulator and has good flexibility. The first washer 410 is of an H shape as a whole and includes the first gasket portion 411, the connecting portion 413, and the second gasket portion 412 that are sequentially connected. The first gasket portion 411 is of a flat plate structure and is formed by one end of the connecting portion 413 extending outward. The first gasket portion 411 is accommodated in the housing assembly 100 and is attached to an inner surface of the housing assembly 100. The second gasket portion 412 is also of a flat plate structure and is formed by another end of the connecting portion 413 extending outward. The second gasket portion 412 is disposed on an outer surface of the housing assembly 100 and is disposed opposite to the first gasket portion 411. Two ends of the connecting portion 413 are respectively connected to the first gasket portion 411 and the second gasket portion 412 in a one-to-one correspondence manner. Correspondingly, the housing assembly 100 is provided with the through hole 102 for the connecting portion 413 to run through. In this embodiment, the foregoing first gasket portion 411, the connecting portion 413, and the second gasket portion 412 are integrally formed so that the first washer 410 can be assembled and disassembled in one time, improving assembly and disassembly efficiencies of the first washer 410. It can be understood that in other embodiments of this application, the first gasket portion 411, the connecting portion 413, and the second gasket portion 412 may alternatively be formed separately.

For the foregoing rivet 420, specifically referring to FIG. 5, FIG. 5 is a stereoscopic schematic diagram of the rivet 420. The rivet 420 is of an H shape as a whole and includes the shaft portion 421, and an end portion 422 and the limiting portion 423 that are respectively disposed at two ends of the shaft portion 421. The shaft portion 421 is of a cylindrical structure and sequentially runs through the first gasket portion 411, the connecting portion 413, and the second gasket portion 412. Correspondingly, the first gasket portion 411, the connecting portion 413, and the second gasket portion 412 are respectively provided with hole structures for the shaft portion 421 to run through. In this embodiment, the hole structures are all through hole structures having the same radial size and constituting a cylinder, while in other embodiments of this application, the hole structures may alternatively be different in size. The end portion 422 is disposed at an end of the shaft portion 421 that is accommodated in the accommodating cavity 101 of the housing assembly 100, and is located on a side of the first gasket portion 411 facing away from the second gasket portion 412. The end portion 422 is formed by the end of the shaft portion 421 extending outward, the end being accommodated in the housing assembly 100. The end portion 422 is of a flat plate structure as a whole and has a cross-sectional contour larger than a cross-sectional contour of the shaft portion 421. The foregoing conductive plate 300 is electrically connected to the end portion 422. The limiting portion 423 is disposed at an end of the shaft portion 421 that extends out of the housing assembly 100, and is located on a side of the second gasket portion 412 facing away from the first gasket portion 411. That is, the first washer 410 is located between the end portion 422 and the limiting portion 423. The limiting portion 423 is formed by the end of the shaft portion 421 extending outward, the end extending out of the housing assembly 100, and has a cross-sectional contour slightly larger than the cross-sectional contour of the shaft portion 421. The end portion 422 and the limiting portion 423 together are configured to press the first gasket portion 411 and the second gasket portion 412 to seal the through hole 102. It should be noted that in this embodiment, the limiting portion 423 is formed by compressional deformation of the rivet 420 during a riveting process, and before the riveting process, the limiting portion 423 and the shaft portion 421 are the same in shape, both being of cylindrical structures.

Optionally, before the riveting process of the rivet 420, the second gasket portion 412 in this embodiment is of a hollow cylindrical structure extending in parallel to the connecting portion 413. The second gasket portion 412 is compressed by the limiting portion 423 to deform during the riveting process of the rivet 420 and flange outward to be opposite to the first gasket portion 411 and closely attached to the outer surface of the housing assembly 100.

Furthermore, to avoid a case that during the riveting process of the rivet 420, the limiting portion 423 piercing the second gasket portion 412 causes contact between the limiting portion 423 and the housing assembly 100 and then causes a short circuit of the battery unit 1, the feedthrough assembly 400 further includes an insulator 430. Specifically, with reference to FIG. 1 and FIG. 2, the insulator 430 is disposed between the second gasket portion 412 and the limiting portion 423. The provision of the insulator 430 forms a gap between the limiting portion 423 and the second gasket portion 412 and avoids a direct crimping force. Alternatively, the limiting portion 423 is still in contact with the second gasket portion 412, which means that the direct crimping force still exist therebetween, but the direct crimping force may be reduced to some extent because part of the pressure on the limiting portion 423 is shared by the insulator 430. This can avoid or alleviate risks that the second gasket portion 412 is pierced by the limiting 423 and improve safety of the battery unit 1. Optionally, the insulator 430 is an annular washer, where the annular washer fits around the shaft portion 421 and is embedded between the second gasket portion 412 and the limiting portion 423.

Figure 6:
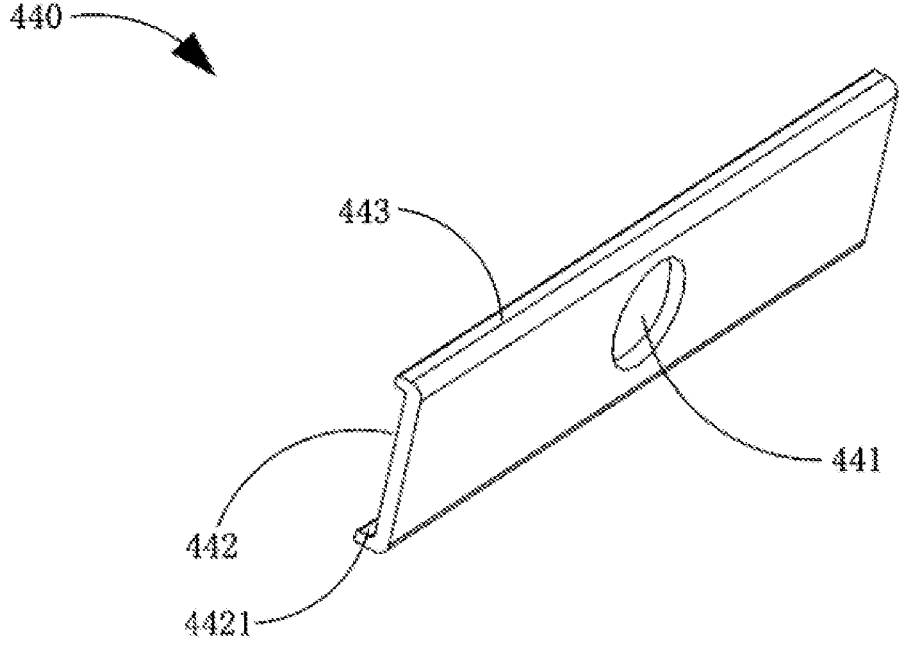
FIG. 6 is a stereoscopic schematic diagram of the second washer in FIG. 1.

In some embodiments, the feedthrough assembly 400 further includes a second washer 440, where the second washer 440 is an insulator embedded between the end portion 422 of the rivet 420 and the first gasket portion 411. Specifically, referring to FIG. 6, FIG. 6 is a stereoscopic schematic diagram of the second washer 440 and with reference to other accompanying drawings, the second washer 440 is of a plate structure, where a via hole 441 for the shaft portion 421 to run through is provided at the center of the second washer 440, and the second washer 440 fits around the shaft portion 421 through the via hole 441. A side of the second washer 440 facing away from the first gasket portion 411 is provided with an accommodating groove 442, where the accommodating groove 442 is configured to accommodate the end portion 422 of the rivet. The provision of the accommodating groove 442 can prevent the end portion 422 from being exposed outside the second washer 440 and occupying excessive space and can also avoid contact between the side of the rivet 420 and the housing assembly 100 when the rivet accidentally rotates relative to the housing assembly 100, thereby avoiding a risk of contact between the end portion 422 and the housing assembly 100.

Furthermore, to avoid a case that the end portion 422 of the rivet 420 rotating inside the housing assembly 100 causes the end portion 422 to interfere with other components in the housing assembly 100, such as the electrode assembly 200, the conductive element, and the conductive plate, the second washer 440 is circumferentially fastened relative to the through hole of the housing assembly 100. Meanwhile, a side wall of the end portion 422 and a side wall of the accommodating groove 442 are at least partially attached to each other, so as to prevent the end portion 422 from rotating relative to the second washer 440. Specifically, with reference to FIG. 5 and FIG. 6, the side wall of the end portion 422 includes two first side wall units 4221 disposed opposite to each other. The accommodating groove 442 extends in a length direction of the second washer 440, and two ends thereof both penetrate the second washer 440. The groove wall of the accommodating groove 442 includes two second side wall units 4421 disposed opposite to each other. One of the first side wall units 4221 is correspondingly attached to one of the second side wall units 4421. The second washer 440 is circumferentially fastened relative to the rivet 420. It can be known based on the second washer 440 being unable to rotate relative to the housing assembly 100 that the rivet 420 is also unable to rotate relative to the housing assembly 100. It can be understood that in other embodiments of this application, the end portion 422 of the rivet and the accommodating groove 442 may alternatively be in another shape, provided that after the end portion 422 is accommodated in the accommodating groove 442, the side wall of the end portion 422 and the groove wall of the accommodating groove 442 are at least partially attached to each other, and the end portion 422 does not rotate relative to the second washer 440. For example, in some embodiments, the cross-sectional contour of groove wall of the accommodating groove 442 is a closed polygon, the end portion 422 fits with the accommodating groove 442 in shape, and the side wall of the end portion 422 is perfectly attached to the groove wall of the accommodating groove.

It should be noted that there are various methods for making the second washer 440 be circumferentially fastened relative to the through hole 102 of the housing assembly 100. For example, in some embodiments, the side wall of the second washer 440 is at least partially attached to the inner surface of the housing assembly 100 so as to prevent the second washer 440 from rotating around the rivet 420 relative to the housing assembly 100. Specifically, the side wall of the second washer 440 includes two third side wall units 443 disposed opposite to each other, where one of the third side wall units 443 is in contact with an inner surface of the above cover 120, and the other of the third side wall units 443 is in contact with the inner surface of the housing 110, so that the second washer 440 is circumferentially fastened relative to the through hole 102 and cannot rotate. In addition, the second washer 440 is fastened relative to the housing assembly 100 in an axial direction of the rivet 420, so that the second washer 440 is fastened relative to the housing assembly 100. For another example, in other embodiments, the second washer 440 is directly fastened to the housing assembly 100.

Furthermore, to avoid the short circuit of the battery unit 1 caused by an electrode plate in the electrode assembly 200 in physical contact with the rivet 420, the electrode plate being electrically connected to the housing assembly 100, the battery unit 1 further includes an insulating partition 500. Specifically, referring to FIG. 1 and FIG. 2, the insulating partition 500 is fastened inside the housing assembly 100 and is disposed between the end portion 422 of the rivet 420 and the electrode assembly 200 to separate the rivet 420 from the electrode assembly 200. The insulating partition 500 is provided with a through groove 501, where the through groove 501 penetrates the insulating partition 500 in a direction of the electrode assembly 200 toward the rivet 420. One end of the above conductive plate 300 is electrically connected to an electrode plate in the electrode assembly 200, and another end runs through the through groove 501 and is electrically connected to the rivet 420.

The battery unit 1 according to some embodiments of this application includes the housing assembly 100, the electrode assembly 200, the conductive plate 300, and the feedthrough assembly 400. The feedthrough assembly 400 includes the first washer 410 and the rivet 420. The first washer 410 includes the first gasket portion 411 accommodated in the housing assembly 100, the second gasket portion 412 disposed on the outer surface of the housing assembly 100, and the connecting portion 413 that connects the first gasket portion 411 and the second gasket portion 412. The housing assembly 100 is provided with the through hole 102 for the connecting portion 413 to run through. The rivet 420 sequentially runs through the first gasket portion 411, the connecting portion 413, and the second gasket portion 412. The end portion 422 of the rivet 420 and the limiting portion 423 are configured to press the first gasket portion 411 and the second gasket portion 412 to seal the through hole 102. A positive electrode plate or a negative electrode plate in the electrode assembly 200 is electrically connected to the rivet 420 via the conductive plate 300, so as to make the rivet 420 be an external terminal of the battery unit 1.

As compared with existing battery units in the market, in the battery unit 1, the feedthrough assembly 400 is not fastened on the housing assembly 100 through thermal processing processes such as welding, but the first washer 410 and the rivet 420 are mounted to the housing assembly 100 via a clamping force applied to the first gasket portion 411 and the second gasket portion 412 after the rivet 420 is riveted and deforms and an interaction force produced by the housing assembly 100. This can effectively avoid a defect that local stress of a part of the housing assembly 100 corresponding to the feedthrough assembly 400 conspicuously changes due to a thermal effect. That is, sealing performance of the battery unit 1 can be improved to some extent.

Figure 7:
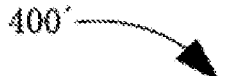
FIG. 7 is a schematic exploded view of a feedthrough assembly according to an embodiment of this application.
Figure 7:
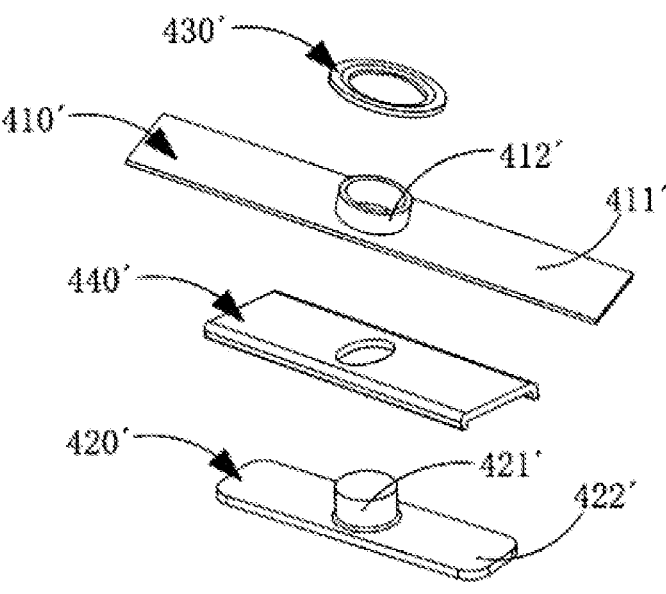

Based on the same inventive concept, this application further provides a feedthrough assembly 400'. Specifically referring to FIG. 7, FIG. 7 is a schematic exploded view of the feedthrough assembly 400', where the feedthrough assembly 400' is basically the same as the feedthrough assembly 400 in the foregoing embodiments in structure. For ease of description, the feedthrough assembly 400 in the foregoing embodiments is referred to as a first feedthrough assembly 400, and the feedthrough assembly 400' in this embodiment is referred to as a second feedthrough assembly 400'.

Specifically, the second feedthrough assembly 400' includes a first washer 410', a rivet 420', an insulator 430', and a second washer 440'. The insulator 430' and the second washer 440' respectively have the same shape structures and positional relationships as the insulator 430 and the second washer 440 in the first feedthrough assembly 400. For details, reference may be made to the foregoing embodiments, and the insulator 430' and the second washer 440' are not described in this embodiment again. A main difference between the second feedthrough assembly 400' and the first feedthrough assembly 400 lies in the first washer 410' and the rivet 420', specifically as follows:

The first washer 410 in the first feedthrough assembly 400 includes the first gasket portion 411, the second gasket portion 412, and the connecting portion 413, and the rivet 420 includes the shaft portion 421, the end portion 422, and the limiting portion 423.

The first washer 410' in the second feedthrough assembly 400' includes a first gasket portion 411' and a connecting portion 412', where the first gasket portion 411' is formed by extending outward from an end of the connecting portion 412'. The rivet 420' in the second feedthrough assembly 400' includes a shaft portion 421' and an end portion 422', where the shaft portion 421' sequentially runs through the first gasket portion 411' and the connecting portion 412'. The end portion 422' is disposed at a first end of the shaft portion 421' and is formed by a first end of the shaft portion 421' extending outward. A second end of the shaft portion 421' is configured for forming a limiting portion by compression during a riveting process (reference can be made to the limiting portion 423 in the first feedthrough assembly), so as to make the end portion 422' and the limiting portion are configured to press the first gasket portion 411' and an end of the connecting portion 412' farther away from the first gasket portion 411', thereby making the end of the connecting portion 412' farther away from the first gasket portion 411' flange outward to be a second gasket portion disposed opposite to the first gasket portion 411' (reference can be made to the second gasket portion 412 in the first feedthrough assembly). In this embodiment, the end portion 422' is fastened to an end of the shaft portion 421' closer to the first gasket portion 411'. Certainly, in other embodiments of this application, the end portion 422' may alternatively be fastened to an end of the shaft portion 421' farther away from the first gasket portion 411'.

The second feedthrough assembly 400' can be applied to a battery unit, and the second feedthrough assembly 400' and the first feedthrough assembly 400 have the basically same fastening method. The second feedthrough assembly 400' is fastened to the housing assembly through the riveting process of the rivet 420' without using thermal processing processes such as welding, so that the second feedthrough assembly 400' can effectively avoid the defect that local stress of a part of the housing assembly corresponding to the feedthrough assembly conspicuously changes due to a thermal effect.

Finally, it should be noted that the foregoing embodiments are merely intended to describe the technical solutions of this application, and are not intended to limit this application. Under the idea of this application, the foregoing embodiments or the technical features in different embodiments can also be combined, the steps can be implemented in any order, and there are many other changes in different aspects of this application as described above, which, for the sake of brevity, are not provided in detail. Although this application is described in detail with reference to the foregoing embodiments, persons of ordinary skill in the art should understand that modifications can be made to the technical solutions described in the foregoing embodiments, or equivalent substitutions can be made to some technical features therein, and these modifications or substitutions do not make the essence of the corresponding technical solutions depart from the scope of the technical solutions of all embodiments of this application.

What is claimed is:

1. A battery unit, comprising: a housing assembly, an electrode assembly, a conductive plate electrically connected to the electrode assembly, and a feedthrough assembly; wherein the electrode assembly and the conductive plate are both accommodated in the housing assembly;

the feedthrough assembly comprises a first washer and a rivet;

the first washer comprises a first gasket portion, a second gasket portion, and a connecting portion; wherein the first gasket portion is accommodated in the housing assembly, the second gasket portion is disposed on an outer surface of the housing assembly, the connecting portion connects the first gasket portion and the second gasket portion, and the housing assembly is provided with a through hole for the connecting portion to run through;

the rivet comprises a shaft portion, an end portion, and a limiting portion; wherein the shaft portion sequentially runs through the first gasket portion, the connecting portion, and the second gasket portion; the end portion is disposed at a first end of the shaft portion, the first end of the shaft portion being accommodated in the housing assembly; the limiting portion is disposed at a second end of the shaft portion, the second end of the shaft portion extending out of the housing assembly; and the end portion and the limiting portion are configured to press the first gasket portion and the second gasket portion to seal the through hole; and the conductive plate is electrically connected to the rivet.

2. The battery unit according to claim 1, wherein the first gasket portion, the second gasket portion, and the connecting portion are integrally formed; and the first gasket portion and the second gasket portion are of plate structures.

3. The battery unit according to claim 1, wherein the limiting portion is formed by compressional deformation of the rivet during a riveting process, and the end portion is of a plate structure.

4. The battery unit according to claim 1, wherein the battery unit further comprises an insulator, and the insulator is disposed between the second gasket portion and the limiting portion.

5. The battery unit according to claim 4, wherein the insulator is an annular washer, and the annular washer fits around the shaft portion.

6. The battery unit according to claim 1, wherein the battery unit further comprises a second washer, and the second washer is embedded between the end portion and the first gasket portion.

7. The battery unit according to claim 6, wherein the second washer is provided with an accommodating groove configured to accommodate the end portion; and a side wall of the end portion and a groove wall of the accommodating groove are at least partially attached to each other, so as to prevent the end portion from rotating relative to the second washer.

8. The battery unit according to claim 7, wherein the side wall of the end portion comprises two first side wall units disposed opposite to each other, and the groove wall of the accommodating groove comprises two second side wall units disposed opposite to each other, wherein one of the first side wall units is attached to one of the second side wall units.

9. The battery unit according to claim 6, wherein a side wall of the second washer is at least partially attached to an inner surface of the housing assembly, so as to prevent the second washer from rotating around the rivet relative to the housing assembly.

10. The battery unit according to claim 6, wherein the second washer is fastened to the housing assembly.

11. The battery unit according to claim 1, wherein the battery unit further comprises an insulating partition, and the insulating partition is disposed between the end portion and the electrode assembly; and the insulating partition is provided with a through groove, wherein the conductive plate runs through the through groove and is electrically connected to the rivet.

12. A feedthrough assembly, comprising: a first washer and a rivet;

the first washer comprises a first gasket portion and a connecting portion; wherein the first gasket portion is formed by extending outward from a first end of the connecting portion; and the rivet comprises a shaft portion and an end portion; wherein the shaft portion is configured to sequentially run through the first gasket portion and the connecting portion, the end portion is disposed at a first end of the shaft portion, and a second end of the shaft portion is configured for forming a limiting portion by compression during a riveting process, so as to make the end portion and the limiting portion are configured to press the first gasket portion and an end of the connecting portion farther away from the first gasket portion, thereby making the end of the connecting portion farther away from the first gasket portion flange outward to be a second gasket portion disposed opposite to the first gasket portion.

13. The feedthrough assembly according to claim 12, wherein the feedthrough assembly further comprises an insulator, and the insulator fits around the shaft portion.

14. The feedthrough assembly according to claim 12, wherein the end portion is fastened to an end of the shaft portion closer to the first gasket portion.

15. The feedthrough assembly according to claim 14, wherein the feedthrough assembly further comprises a second washer, and the second washer is embedded between the end portion and the first gasket portion.

16. The feedthrough assembly according to claim 15, wherein the second washer is provided with an accommodating groove configured to accommodate the end portion; and a side wall of the end portion and a groove wall of the accommodating groove are at least partially attached to each other, so as to prevent the end portion from rotating relative to the second washer.

17. The feedthrough assembly according to claim 16, wherein the side wall of the end portion comprises two first side wall units disposed opposite to each other, and the groove wall of the accommodating groove comprises two second side wall units disposed opposite to each other, wherein one of the first side wall units is attached to one of the second side wall units.

* * * * *